(12) United States Patent
Hu et al.

(10) Patent No.: US 12,086,192 B2
(45) Date of Patent: Sep. 10, 2024

(54) MACHINE FOR EXCEPTION HANDLING IN A PROCESSING NETWORK

(71) Applicant: NORTH FORK HOLDINGS, LLC, Schaumburg, IL (US)

(72) Inventors: John Yih-Jung Hu, Chicago, IL (US); Qing Xia, Aurora, IL (US); Venkatchalapathi Madheswaran, Schaumburg, IL (US)

(73) Assignee: North Fork Holdings, LLC, Schaumburg, IL (US)

( * ) Notice: Subject to any disclaimer, the term of this patent is extended or adjusted under 35 U.S.C. 154(b) by 334 days.

(21) Appl. No.: 17/365,798

(22) Filed: Jul. 1, 2021

(65) Prior Publication Data
US 2021/0326394 A1 Oct. 21, 2021

Related U.S. Application Data

(63) Continuation of application No. PCT/US2020/012945, filed on Jan. 9, 2020.
(Continued)

(51) Int. Cl.
*G06F 16/23* (2019.01)
*G06F 16/25* (2019.01)
(Continued)

(52) U.S. Cl.
CPC .......... *G06F 16/93* (2019.01); *G06F 16/2379* (2019.01); *G06F 40/166* (2020.01);
(Continued)

(58) Field of Classification Search
CPC .... G06F 16/93; G06F 16/2379; G06F 40/226; G06F 40/166; G06F 16/254;
(Continued)

(56) References Cited

U.S. PATENT DOCUMENTS 8,296,221 B1 * 10/2012 Waelbroeck ........... G06Q 40/04
705/37
8,924,272 B2 12/2014 Venkatasubramanian et al.
(Continued)

FOREIGN PATENT DOCUMENTS

WO WO 2020/146642 A1 7/2020

OTHER PUBLICATIONS

Marti et al. "System For Processing Formatted Data" CN 101438272 A; May 20, 2009 (Year: 2009).*
(Continued)

*Primary Examiner* — Dennis Truong
(74) *Attorney, Agent, or Firm* — Crowell & Moring LLP

(57) ABSTRACT

An exception handling machine is configured to receive a first document from a source document processing system and provide a first revised document to a destination document processing system. The exception handling machine is configured to detect an exception flag in at least one data field of the first document and determine at least one exception handling rule for the first document based on at least one other data field in the first document and the exception flag, determine an exception code corresponding to the exception handling rule, insert the exception code into the first document to generate the first revised document, and provide the first revised document to the destination document processing system. The destination document processing system is programmed to respond to the exception code inserted in the revised first document by providing the first revised document to a client device connected to the destination document processing system.

7 Claims, 5 Drawing Sheets

Related U.S. Application Data

(60) Provisional application No. 62/791,191, filed on Jan. 11, 2019.

(51) Int. Cl.
    *G06F 16/93*    (2019.01)
    *G06F 40/166*    (2020.01)
    *G06Q 10/10*    (2023.01)
    *G06Q 20/40*    (2012.01)
    *G06Q 30/04*    (2012.01)
    *G06Q 40/12*    (2023.01)

(52) U.S. Cl.
CPC ........... *G06Q 10/10* (2013.01); *G06F 16/254* (2019.01); *G06F 16/258* (2019.01); *G06Q 20/405* (2013.01); *G06Q 30/04* (2013.01); *G06Q 40/12* (2013.12)

(58) Field of Classification Search
CPC .... G06F 16/258; G06F 40/174; G06F 11/008; G06F 16/1794; G06F 16/215; G06Q 40/03
See application file for complete search history.

(56) References Cited

U.S. PATENT DOCUMENTS

| | | | | |
|---|---|---|---|---|
| 10,824,606 | B1* | 11/2020 | Kandel | G06F 16/215 |
| 11,734,238 | B2* | 8/2023 | Medisetti | G06F 16/27 |
| | | | | 707/692 |
| 2002/0095406 | A1* | 7/2002 | McGeorge, Jr. | G06F 40/226 |
| 2005/0028084 | A1* | 2/2005 | Dziejma | G06F 40/226 |
| | | | | 715/225 |
| 2006/0028689 | A1 | 2/2006 | Perry et al. | |
| 2006/0212487 | A1* | 9/2006 | Kennis | G06Q 40/00 |
| 2009/0319544 | A1* | 12/2009 | Griffin | G06F 16/25 |
| 2010/0010968 | A1* | 1/2010 | Redlich | G06Q 10/00 |
| | | | | 707/E17.046 |
| 2011/0055172 | A1* | 3/2011 | Tan | G06F 16/24568 |
| | | | | 707/769 |
| 2012/0005527 | A1* | 1/2012 | Engel | H04N 21/2408 |
| | | | | 714/E11.02 |
| 2014/0067633 | A1* | 3/2014 | Venkatasubramanian | |
| | | | | G06Q 20/102 |
| | | | | 705/34 |
| 2014/0279393 | A1* | 9/2014 | Coomes | G06Q 40/03 |
| | | | | 705/38 |
| 2015/0106258 | A1 | 4/2015 | Coomes et al. | |
| 2016/0350390 | A1* | 12/2016 | Dhayapule | G06F 16/2365 |
| 2018/0032286 | A1* | 2/2018 | Panda | G06F 40/174 |
| 2018/0032496 | A1* | 2/2018 | Panda | G06F 40/226 |
| 2019/0361767 | A1* | 11/2019 | Karthik | G06F 11/0781 |
| 2019/0361795 | A1* | 11/2019 | Cole | G06F 11/3636 |
| 2022/0358136 | A1* | 11/2022 | Medisetti | G06N 7/01 |

OTHER PUBLICATIONS

International Search Report and Written Opinion issued in corresponding PCT Application No. PCT/US2020/012945, mailed on Apr. 9, 2020 (7 pages)

* cited by examiner

MACHINE FOR EXCEPTION HANDLING IN A PROCESSING NETWORK

CROSS-REFERENCE TO RELATED APPLICATIONS

This application is a continuation of International Application No. PCT/US2020/012945, filed Jan. 9, 2020, published as WO2020/146642 on Jul. 16, 2020, and titled "Machine for Exception Handling in a Processing Network", which claims the benefit of and priority to U.S. Provisional Application No. 62/791,191, filed Jan. 11, 2019, titled "Machine for Exception Handling in a Processing Network", the entire contents of both of which is hereby incorporated by reference herein.

TECHNICAL FIELD

This disclosure relates to machines and complex system architectures for exception handling in a processing network, including Procure to Pay (P2P) environments.

BACKGROUND

Procure to Pay (P2P) platforms and service providers enable the integration of the purchasing department with the accounts payable department, linking the procurement process with the payment process. Many P2P platforms and services, such as those provided by third party providers (e.g., SAP ARIBA, COUPA, IVALUA, and JAGGAER) include the ability to process invoices. However, many P2P platforms require "complete" invoices in order to allow that invoice into its processing queues. In such examples, in order to be considered complete, all the data residing in a digital representation of the invoice must exactly match data resident in the P2P platform.

SUMMARY

In accordance with various embodiments, an exception handling machine comprises a communication interface in communication with a source document (e.g., invoice) processing system and a destination document processing system (e.g., a P2P platform), the communication interface configured to receive a first document (e.g., an invoice) from the source document processing system (e.g., an invoice processing center) and to provide a first revised document to the destination document processing system. The exception handling machine also includes at least one processing device configured to detect at least one exception flag in at least one data field of the first document and determine at least one exception handling rule for the first document based on at least one other data field in the first document and the at least one exception flag. The at least one processing device also can determine at least one exception code corresponding to the at least one exception handling rule and insert the at least one exception code into the first document to generate the first revised document. The exception handling machine then causes the communication interface to provide the first revised document to the destination document processing system.

In various embodiments, the exception handling machine is further configured to program the destination document processing system to respond to the at least one exception code inserted in the revised first document by providing the first revised document to a client device connected to the destination document processing system.

In some embodiments, the exception flag is added to the first document by the source document processing system. The source document processing system may be configured to retrieve client reference data (e.g., stored in the client reference database) from the destination processing center including at least one required data field of the first document as required by the destination document processing system (e.g., a vendor name, an invoice number, a PO number, etc.) and at least one constraint on the at least one required data field (e.g., the vendor name is on a list of preapproved vendors, the PO number or invoice number must match a certain format, etc.). The source document processing system (e.g., the invoice processing center) receives a first original document (e.g., a paper or electronic invoice) and generates the first document from data within the first original document, the first document having a format dictated by the destination document processing system. For example, the source document processing system generates an electronic invoice in the format required by the P2P system. The source document processing system determines that the first document is either missing the at least one required data field (e.g., missing a PO number, vender name, etc.) or includes data within the at least one required data field that does not conform to the at least one constraint on the at least one data field (e.g., PO number is in the wrong format, vender name not on approved list, etc.). As a result, the source document processing system adds the exception flag to the first document and communicates the first document to the exception handling machine. In one particular embodiment, the exception flag comprises the phrase "Change Me."

In some embodiments, the processing device is further configured to receive a second document (e.g., a PO), the second document providing preapproval to allow the destination document processing system to process the first document. The processing device may determine that at least one data field in the second document does not match at least one data field in the first document (e.g., the PO does not match the invoice). The processing device may then determine at least one pattern-based approval rule with which to process the first document and the second document, and then process the first document and the second according to the at least one pattern-based approval rule to determine that the first document is approved to be processed by the destination document processing system. In this manner, the system provides an automated "fuzzy match" function to determine that an particular invoice is already pre-approved by a PO to be paid, even though the PO and the invoice do not directly match (e.g., the PO includes a singular approval amount, but the invoice has multiple discrete line items that add up to (or approximately close to) the approved amount). The processing device of the exception handling machine may then void the first document within the destination document processing system and generate a third document (e.g., a new invoice) based on the second document, the third document having a format dictated by the destination document processing system and including the data of the second document, and provide the third document to the destination document processing system. In certain approaches, this third document (new invoice) may be generated using a PO-flip technique.

In another approach, the exception handling machine may be further configured to enable a client device connected to the exception handling machine to enable or disable a selected pattern-based approval rule in order to enable or disable the exception handling machine to process documents with the selected pattern-based approval rule.

DETAILED DESCRIPTION

Figure 1:
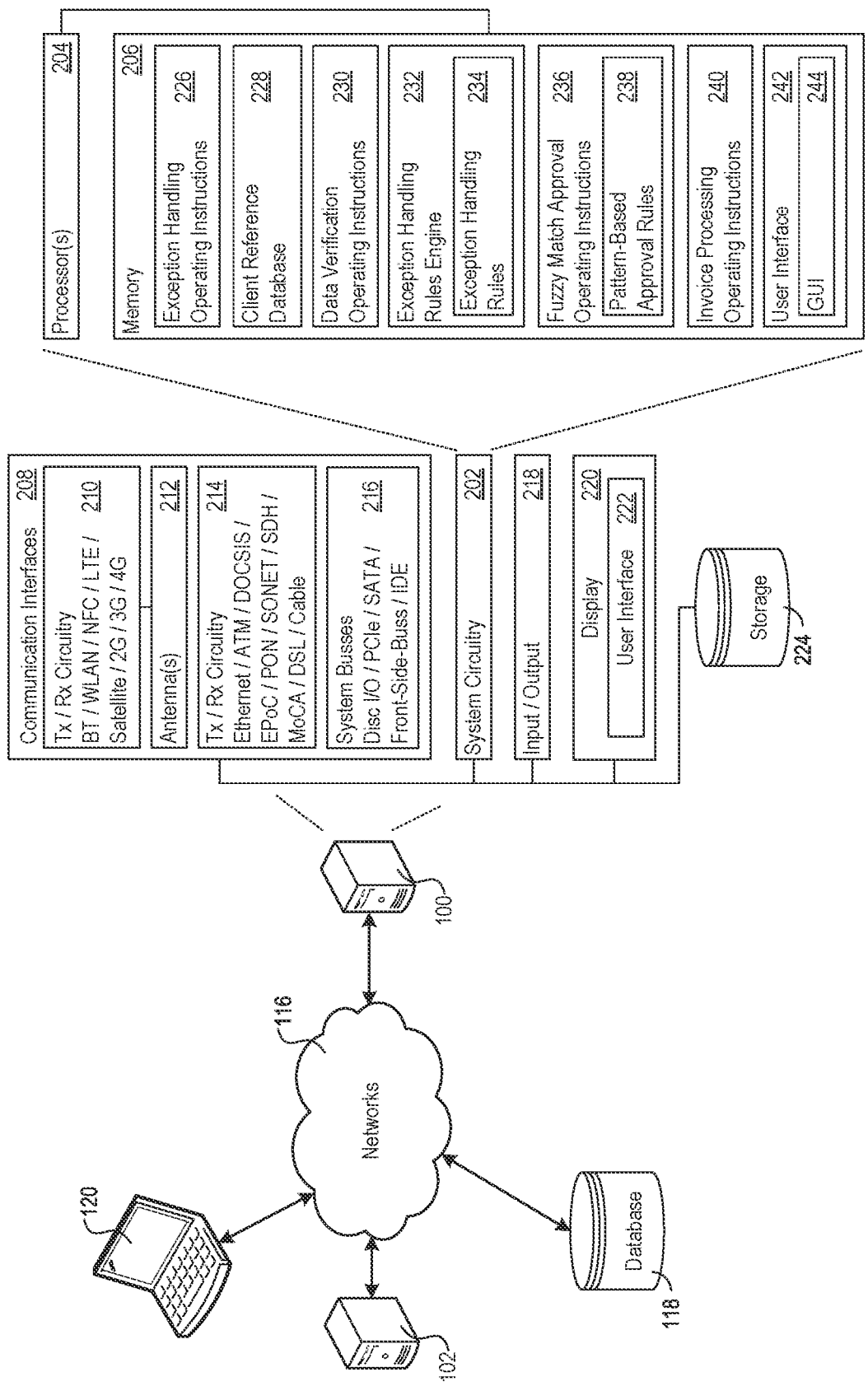
FIG. 1 shows an example specific system implementation for the exception handling machine and for the system generally, in accordance with various embodiments.
Figure 2:
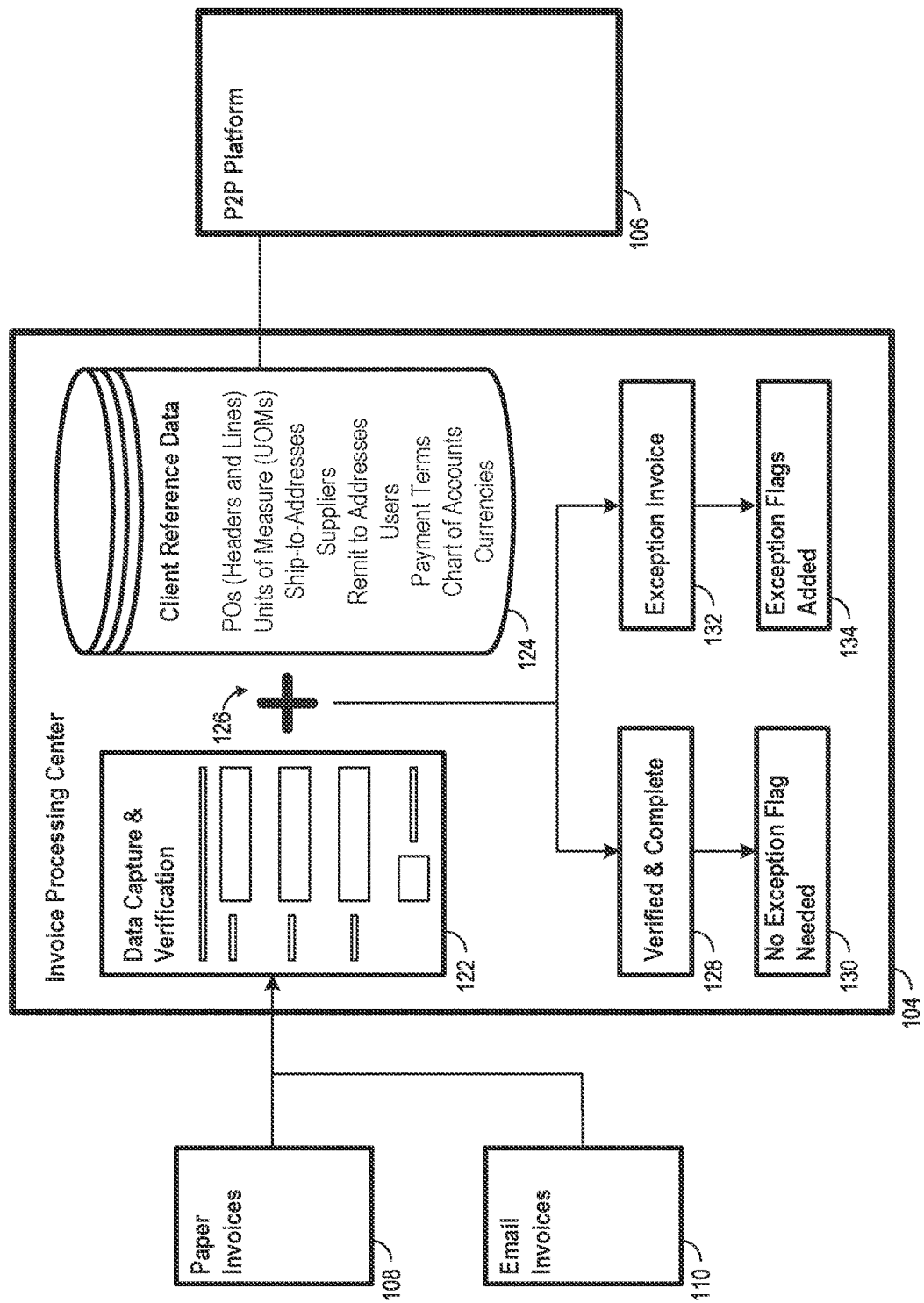
FIG. 2 shows an example block diagram of the invoice processing center and the system generally in accordance with various embodiments.

The Gartner Group estimates that 46% of invoices submitted to American business are still printed on paper. The vast majority of the rest of those invoices are "scanned paper" that are emailed to corporate Accounts Payable (A/P) departments. These can come in the form of PDF, Jpeg, PNG, etc.).

These documents need to be converted to "digital representations" in order to be processed by modern Procure to Pay (P2P) platforms including SAP ARIBA, COUPA, IVALUA, JAGGAER, and others.

In the past, scanning vendors such as SYMBEO and KOFAX have converted these paper invoices via Optical Character Recognition (OCR) and human intervention into digital format. However, a problem remains.

Most, if not all P2P platforms require "complete" invoices in order to allow that invoice into its processing queues. In order to be considered complete, all the data residing in the digital representation of the invoice must exactly match data resident in the P2P platform. So, for example, if IBM is a vendor submitting an invoice, IBM must already be resident in the database of the P2P platform as an authorized vendor for that client. Otherwise, IBM must be added as an official vendor in the P2P platform for that client prior to submission of the invoice to that P2P platform.

As noted, if an invoice has exceptions to being complete, those exceptions need to be remedied and cleared before an invoice can be submitted to the P2P platform. Common exceptions include, but are not limited to:
  Missing PO Number.
  Un-matched Supplier: Supplier on the Invoice Doesn't Match P2P Platform Supplier Master.
  Missing Requester.
  Un-matched PO: PO on the Invoice Doesn't Match P2P Platform PO Records.
  Unidentifiable Chart of Account for Non-PO Invoices.
  Other Anomalies:
    a. Unable to Determine Unit Price or Line Amount.
    b. Unable to Match a PO Line.
    c. Unit of Measure Issues.
    d. Missing Item Description.

A current way for handling these exceptions is that Accounts Payable (A/P) departments manually fix all the exceptions on an invoice prior to submission to the P2P platform. Typically, these exceptions are currently dealt with through the scanning vendors' own software, or manually by the client. Many clients would prefer to deal with these exceptions in their P2P platform, which provides a benefit of providing the client with a single and familiar software interface (e.g., the P2P platform) to deal with invoice processing.

As mentioned, Procure-to-Pay (P2P) Platforms typically have a rigid requirement for all invoices accepted into their systems. Most P2P Platforms have a specific flat-file format requirement dictated and published by the P2P Platforms. For example, a specific flat-file format may require data in a CSV or XML format. One example format is COUPA's invoice import format (published at https://success.coupa.com/Integrate/Technical_Documentation/CSV/Import/Invoices). Those invoices that do not match this format are rejected by the P2P Platform. On top of this rigid formatting restriction, the data reflected with in the flat-files must correspond to or be identical to the data stored within the P2P Platform itself or the invoice will again be rejected (e.g., a vendor on the invoice must be included in the vendor list for the client in the P2P platform). This results in a majority of the invoices being rejected. Prior to the instant disclosure, a technology-based solution that moves all invoices (including those that are deemed "imperfect" or incomplete by the P2P Platform) forward into the P2P Platform did not exist and the rejected invoices had to be edited manually to move them forward into the P2P Platform to be processed by the P2P Platform.

The instant disclosure contemplates straightforward and elegant solutions to the problem described above. Some of the disclosed solutions include:

Insertion of generic reference data. In order to have the P2P platform consider an invoice "complete" when processing exceptions exist, an exception handling machine inserts generic reference data (e.g., "Change Me") in the incomplete fields. The exception handling machine or another machine also adds this generic reference data to the client's P2P platform where required, so that when an exception invoice is submitted to the P2P platform, it is considered "complete" by the P2P Platform.

Appending exception codes to invoice records. Clients often have multiple A/P department employees whose job is to review exceptions on invoices and resolve those exceptions. They are typically divided by vendors, geography, department or similar categorizations so that individuals become familiar with the necessary elements of removing exceptions. In certain embodiments, the exception handling machine appends specific exception codes to each exception invoice, allowing for the automatic routing of those invoices to the person assigned to clearing that particular exception. For example, logic may be programmed in the client's P2P program to recognize these exception codes and to perform a particular function, such as routing the invoice to the person or department assigned to that exception code.

Void and Flip Meta Matching Process. In order to bypass the P2P system's rigid matching rules that are required for payment of invoices, the exception handling machine may void and re-create invoices using a unique Meta Matching Process (also called a "fuzzy match" system).

Pattern Rules Engine. The exception handling machine may utilize a universal rules engine that can handle various pattern-based problems with an invoice.

Pattern Rules Engine On/Off Function. The exception handling machine may provide clients with an option to turn automations of the pattern rules engine on and off with a single click using the unique on/off function.

In accordance with various embodiments, the instant solution may include three components:

Invoice Processing Center 104—combination of private client database and scanning service technology.

Exception handling machine 100—Java-based rules engine that implements solutions to handle exceptions in invoices. In various approaches, the exception handling machine is implemented in a server or a cloud-computing environment, such as an Amazon Web Services (AWS) cloud server, possibly in a single-tenant configuration.

Client's P2P Instance 106—Instance of client's data on the P2P Platform.

1: Stage One: Digitizing Invoices into the P2P System

1A: Receiving the Invoices

As is shown in FIG. 1, there is a source of information (invoice) that comes from the client—this can be a paper invoice 108 or an electronic invoice 110 (email, PDF, JPEG, PNG, etc.). This can be any format that cannot be natively read by the P2P Platform's 106 processing center.

In various embodiments, paper invoices 108 are sent to a designated PO Box and Email invoices 110 are sent to a designated email address. Both the PO Box & Email Address may be provided to the client by the provider of the invoice handling services. These locations may then be shared with suppliers and vendors as the proper address/email address for all invoices to be sent.

The invoices are then pulled from each location by the Invoice Processing Center 104. In some approaches, the Invoice Processing Center 104 may be a third party or partner company contracted to provide scanning solutions for the invoices (e.g., DATA DIMENSIONS).

1B: Client Reference Data in the P2P System

Inside P2P Platforms 106, there are several master data elements that invoices typically must reference. The most common of these are listed below:
  a. POs (Headers & Lines)
  b. Units of Measure
  c. Ship-to-Address
  d. Suppliers
  e. Remit-to-Address
  f. Users
  g. Payment Terms
  h. Chart of Accounts (COAs)
  i. Currencies
  j. These can also include custom fields specified by the client (ex: Store Number, Project Code, etc.)

1C: Importing Client Reference Data for Verification

All client reference data is pulled from the P2P Platform 106 via API interface or Flat File Export and sent to a client reference database 124 hosted within the Invoice Processing Center 104.

In order to pull this data into the client reference database 124 from the P2P Platform 106, in some approaches, the exception handling machine 100 builds a data connector between the P2P Platform 106 and the Invoice Processing Center 104 client reference database 124 to query and export the data from the P2P Platform 106 and import into the client reference database 124.

In some embodiments, this connection is a delta load, meaning it only imports the data that has changed since the last import. However, in other approaches, the entire database 124 may be updated.

In some embodiments, most Master Data fields of the client reference database 124 are imported into the client reference database 124 every 24 hours. In some approaches, more static data (such as Chart of Accounts & Currencies) are only imported on an as-needed basis. However, because this is a beta field, the data can be updated as frequently as needed by the client or by the exception handling machine 100.

The fields pulled through this process includes all of the items listed within 1B, above, but may vary based on the client and the P2P platform 106.

This data is stored in the client reference database 124 within the Invoice Processing Center 104 to be used for invoice verification (discussed in 1E, below).

1D: Data Capture

The steps of this process may be completed by the invoice processing center 104.

The invoice processing center's 104 scanning solution capture process may OCR the data from the invoice and possibly have humans validate the data to catch any computer error.

This process captures line-level detail of the invoice (all line-level detail, if desired) & uses that information to fill out a data form 122 that will then be cross-referenced 126 against the Master Data in the client reference database 124.

1E: Data Verification

The data captured in 1D in the data form 122 is then compared 126 against the Client Reference Database 124 that is pulled from the P2P Instance 106 (outlined in 1C, above).

In accordance with various embodiments, after the data from the data form 122 and the client reference database 124 have been compared 126, there are two possible outcomes: (1) The invoice will be a verified complete invoice 128; or (2) the invoice will be an exception invoice 132.

2: Two Types of Invoices & Flagging Exceptions

2A: Verified & Complete Invoices

Invoices that have every line captured without any errors and have all data successfully verified 126 against the data in the Client Reference Database 124 are considered verified and complete 128 and are pushed directly into the exception handling machine 100 and/or the P2P Platform 106. As indicated at 130, no exception flags are needed for the invoice.

The file invoice is now ready to be converted to the appropriate file type by the Invoice Processing Center 104 and sent through the exception handling machine 100 using API and it is then pushed into the client's P2P Platform 106. (Discussed more in 3A, below). Alternatively, the invoice processing center 104 can convert the invoice and push the converted invoice directly into the P2P platform 106.

2B: Exception Invoices & the "Change Me" Function

Exception Invoices 132 are those that have any type of issue that prevents them from being complete and/or verified. Common invoice exceptions include:
  a. Missing PO Number
  b. Un-verified Supplier: Supplier on the Invoice Doesn't Match the client reference database Supplier Master
  c. Missing Requester
  d. Un-verified PO: PO on the Invoice Doesn't Match the client reference database PO Records
  e. Unidentifiable Chart of Account for Non-PO Invoices
  f. Other Anomalies
  g. Unable to Determine Unit Price or Line Amount
  h. Unable to verify a PO Line
  i. Unit of Measure Issues
  j. Missing Item Description When there is an error in a field, the P2P system 106 will not natively accept the invoice regardless of the file format. To remedy this, the invoice processing center 104 and/or the exception handling machine 100 adds an exception flag 134 (e.g., "Change Me") to the missing field.
  a. The exception flag 134 (e.g., "Change Me") is also programmed into the client's P2P instance in the P2P Platform 106 as a valid entry in all or some categories of the master data systems of the client's P2P instance. This allows "Change Me" to be universally accepted by the P2P system 106 as a valid field.

b. In one embodiment, the words "Change Me" (or a similar human readable indication) are used because it is something that an end user looks at and understands that a change is needed. Because these invoices are often seen by a human later in the process, it is made clear to the human that that field needs adjusting. However, the particular words selected for the exception flag 134 themselves do not matter; any other phrase, code, indicator, or flag can be chosen as long as it is used in the same process as a placeholder record on the invoice and in the client's P2P Instance.

3: Exception Handling Machine

3A: Verified & Complete Invoices into P2P Platform

Figure 3:
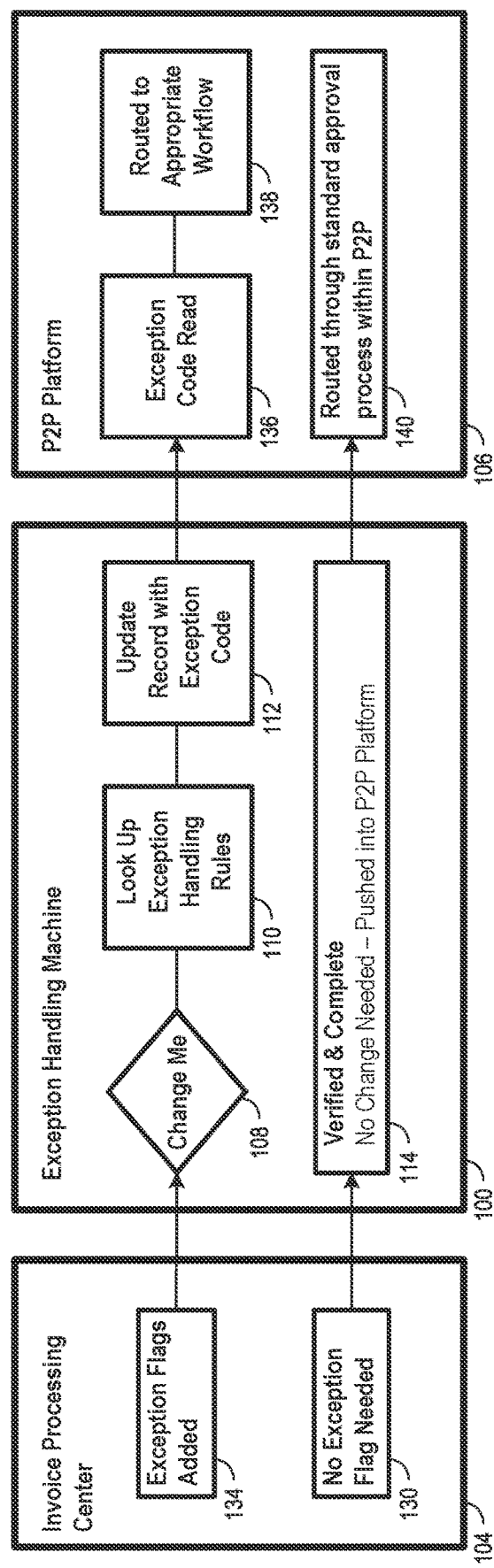
FIG. 3 shows an example block diagram of the exception handling machine and the system generally in accordance with various embodiments.

As is shown in FIG. 3, P2P Systems 106 are able to accept verified & complete invoices as "perfect" invoices. These verified and complete invoices 114 pass through the exception handling machine 100 and into the P2P System 106. In one approach, the exception handling machine 100 does not make any changes to the file as it passes through. This is accepted as a "perfect invoice" into the P2P platform 106. This completes Stage One for the "perfect invoice" that now may move on to Stage Two (details beginning at section 4).

3B: Exception Flags within the Exception Handling Machine

At 108, the exception handling machine 100 recognizes an exception invoice when an exception flag 134 (e.g., "Change Me") is found within the file exported from the Invoice Processing Center 104. When an exception flag 134 is found, the exception handling machine 100 processes the file according to step 3C.

3C: Exception Handling Rules

If the invoice flat file is recognized by the exception handling machine 100 as an exception by including an exception flag at 108 (through step 3B), the next step of automation within the exception handling machine 100 is looking up a corresponding exception handling rule associated with the issue in question relating to the exception flag, as is shown at 110.

The exception handling machine 100 includes a rules engine that powers the exception handing rules and is designed to be adaptable. Adaptability comes in the form of modular pattern recognition where the exception handling machine 100 looks in a database of known patterns and matches invoices to those known patterns. Over time, the exception handling machine 100 may evolve and provide more patterns for customers to leverage. The exception handling machine can pull external data such as PO's from non-P2P systems (direct from ERP), Receipt documents, non-traditional transactions that indicate a pre-approval of an invoice exist, P2P Platform data, data from the incoming invoice file, and any other document that can serve as a basis for automation of matching an approval. Data for the exception handing rules can be accessed through any format (e.g. CSV, XML, or Direct Database connection) that is fed into the exception handling machine 100. For example, this can be done by using call-outs to other customer data sources or databases.

This flexibility of data/rules allows the exception handling machine 100 to establish rules and inferences that go beyond the rigidity of the standard P2P system 106. P2P systems 106 only allow rules to be based on certain sets of data, but the exception handling machine 100 makes it possible to create an unlimited number of rules and inferences by programming the exception handling machine 100 with logic to implement those rules and inferences. In various embodiments, the rules and inferences may be programmed by human users. The rules may be customer-specific and tailored to handle particular exceptions and routing for that customer. For example, one rule may be for invoices with a missing supplier name, but a supplier address in Texas, where the exception handling machine 100 will utilize the rule to put an exception code on the invoice to route the invoice to a Texas supplier manager.

Ultimately, the rules engine allows the flexibility needed to handle any exceptions that come in through from the invoice. This is the system's unique method of moving the invoice forward into the P2P Platform 106 regardless of the problem with the invoice itself.

When the proper exception handling rule is found, the file moves onto step 3D, as shown at 112.

3D: Exception Handling Codes

At 112, once the exception handling machine 100 identifies the proper handling rule, the exception handling machine 100 adds the appropriate exception code to the invoice flat file. In various approaches, the exception handling machine 100 reads in the invoice flat file, updates the exception code field with the proper exception code, then outputs the invoice flat file again.

The exception handling machine 100 then pushes the updated invoice flat file into the P2P Platform 106 via API.

4: Exception Codes within the P2P System

4A: Verified & Complete Invoices Inside the P2P System

As is shown at 140, verified & complete invoices do not require any editing inside the P2P Platform 106, so they are routed directly through the P2P system's 106 standard approval process.

4B: Exception Codes within the P2P System

The exception codes added at 112 by the exception handling machine 100 have corresponding actions programmed within the client's P2P instance 106. The P2P Platform 106 reads the exception code and routes the exception invoice to the appropriate workflow. For example:

a. Approval Group Workflows Within the P2P System 106:
  i. These workflows route the exception invoice to the appropriate exception handler group within the P2P system 106.
  ii. This exception handler group reviews the invoice in question and adjusts the exception flag (e.g., "Change Me") field to be an accurate reflection of the invoice information.
  iii. As a result, the exception invoice has now been made a "perfect invoice" within the P2P platform 106 and resumes the P2P system's 106 standard approval process (e.g., similar to 140).

—or— b. Automated exception handling machine Workflows Outside of The P2P System 106:
  i. These exception codes correspond with rules found within the exception handling machine 100 rules engine (discussed in section 5B, below).
  ii. These exception invoices are categorized as Meta Processing Invoices (see section 5).

Stage two: Verifying PO Backing of Invoices (Meta Processing Invoices and the Meta Matching Process)

The Problem in Stage Two

Most, if not all P2P Platforms are built on the following premise:

Purchase Order (PO)=Approval Document
Invoice=Payment Document

If PO=Invoice, then pay the invoice (equal "=" meaning exact match in structure such as header, line fields, and a tolerance-based match on numeric values such as quantity, unit price, total price, as well as any other parameters as dictated by the P2P Platform).

If PO≠Invoice, then do not pay the invoice (not equal "≠" meaning anything that isn't an exact match).

In ideal scenarios, this matching works and everything is automatically approved. However, more often than not that is not the case.

For example, if a PO is written as one line for a total price of the goods while the invoice is broken into several documents that total the sum of the PO, a P2P Platform 106 would reject those payments. Logically, the invoices technically do match the PO, but P2P systems 106 can only register them as a match if they are identical. Prior to the instant solution, this could only be remedied manually by having a human review the documents and approve/amend them as appropriate.

Figure 4:
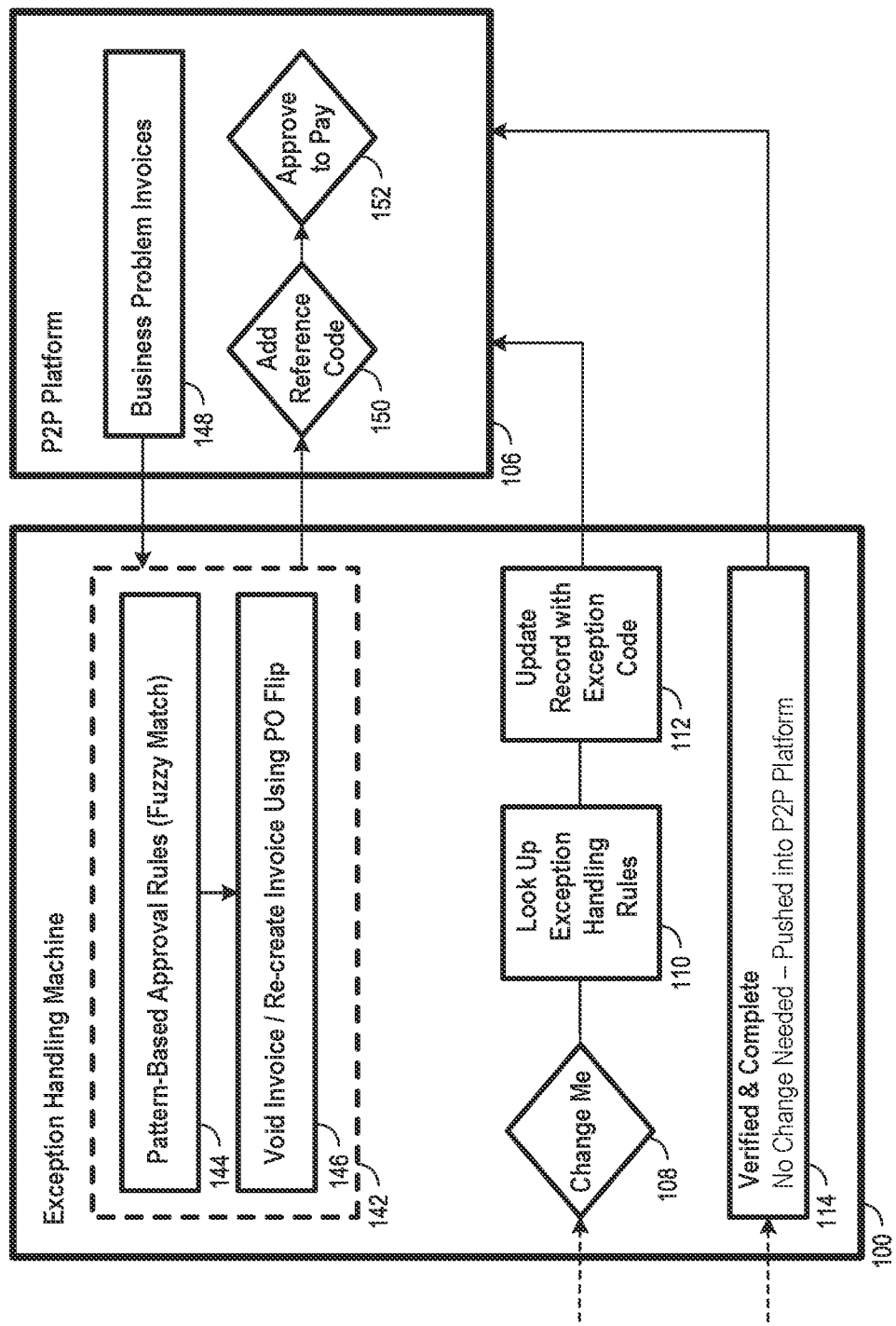
FIG. 4 shows another example block diagram of the exception handling machine and the system generally in accordance with various embodiments.
Figure 5:
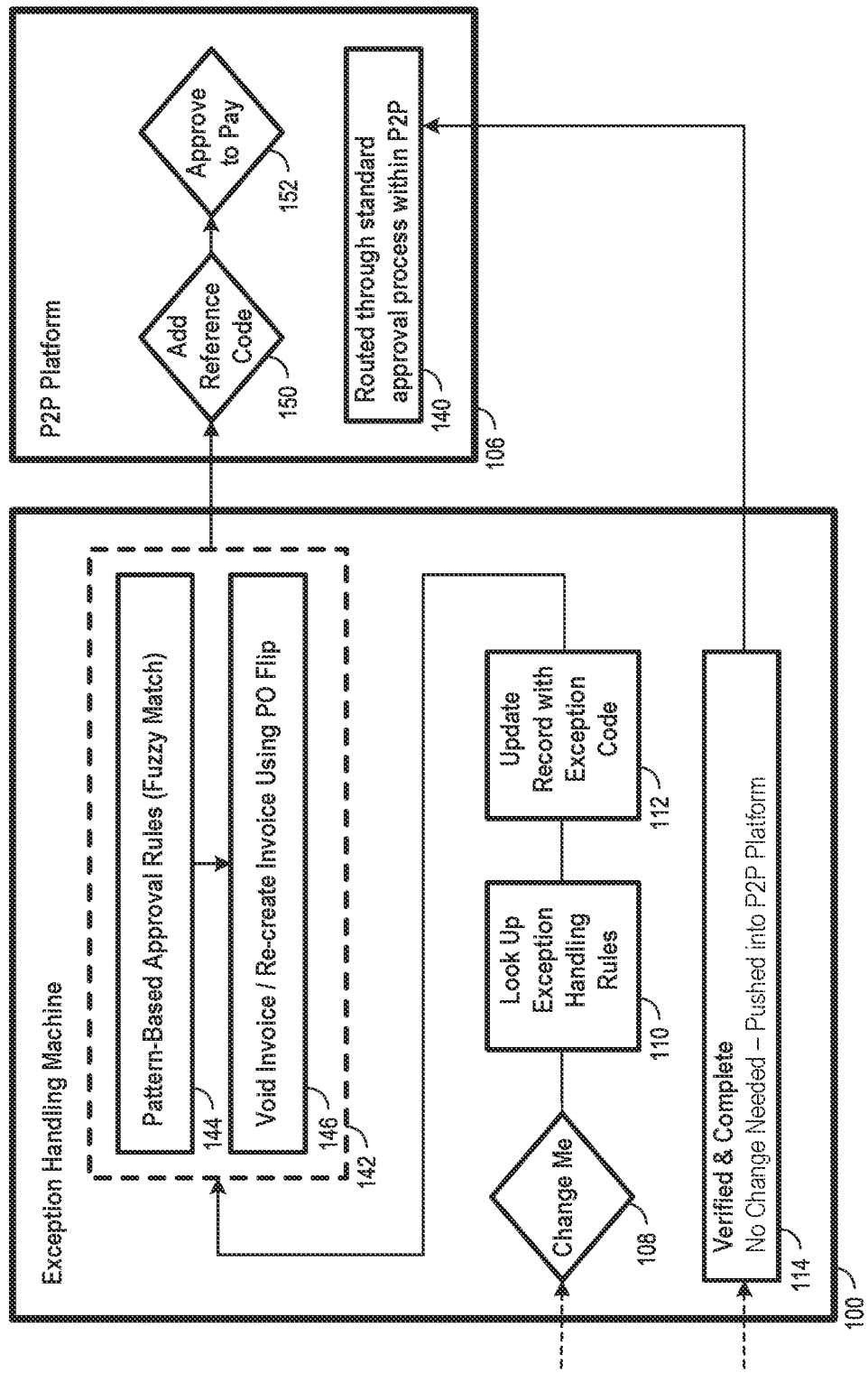
FIG. 5 shows another example block diagram of the exception handling machine and the system generally in accordance with various embodiments.

5: Automated Meta Processing Invoice Correction & Meta Matching ("Fuzzy Match") Process 5A: Pulling Meta Processing Invoices into the Exception Handling Machine As is shown in FIG. 4, in various embodiments, the exception handling machine 100 implements an automated meta processing invoice correction and meta matching process 142. At 148, when the exception codes within the P2P systems 106 are recognized as "Meta Processing Invoices" (or "Business Problem Invoices") (see 4B), they are pushed from the P2P system 106 back out to the exception handling machine 100 via API. (Alternatively, the exception handling machine 100 will preprocess the invoice instead, as is discussed in section 6, below).

In some approaches, the P2P platform 106 puts all Meta Processing Invoices in a folder that is programmed to empty into the exception handling machine 100. In other approaches, the exception handling machine 100 requests these invoices from the P2P system 106 periodically (e.g., every few minutes) via API.

5B: The Exception Handling Machine Meta Matching Process ("Fuzzy Match" System)

The exception handling machine 100 may include a long series of pattern-based approval rules. (Discussed in section 7, below).

As part of the automated meta processing invoice correction and meta matching process 142, when a Meta Processing invoice is accepted back into the exception handling machine 100, the exception handling machine 100 reads the exception code and determines a corresponding meta pattern-based approval rule within the Meta Matching Process (e.g., "fuzzy match") approval system, as shown at 144.

a. Example of a pattern-based approval rule: If the sum of all lines on the invoice match the total of the PO indicated by the invoice and the PO vendor and Invoice Vendor are in the same, the PO and invoices are considered a "fuzzy" match.

Because P2P systems 106 do not provide an option to override the system and mark the PO and invoice as matching, the exception handling machine 100 tricks the P2P system 106 into believing that the two items match in order to allow the P2P system 106 to accept and approve the invoice.

To do this, as is shown at 146, in various embodiments, the exception handling machine 100 sends a message to the P2P System 106 via API that instructs the P2P System 106 to void the existing invoice and re-create the invoice, for example, using the PO-Flip function. "PO Flip" is common terminology with P2P Systems 100 referring to the act of "flipping" a PO into an invoice. This results in a file with identical invoice data as the PO, but in the format of an invoice instead of a PO. After this function, the PO and the invoice match.

5C: Adding Reference Codes

After the original invoice has been voided and it has been re-created, for example, using PO-Flip, a reference code is added to both documents, as shown at 150. The reference code links the two documents so that the client still has access to both versions of the invoice and maintains referential and audit trails.

5D: The Approval

Now that the PO and the invoice match, the invoice can be accepted into the P2P system's 106 rigid approval criteria and the payment proceeds through the standard payment/approval flow within the P2P system 106, as shown at 152.

6: Pre-Processed Meta Matching

6A: Meta Matching Pre-Processing

In some implementations, the exception handling machine 100 completes the Meta Matching ("fuzzy match") Process 142 (discussed above in 5B) before the exception handling machine 100 sends the invoice into the P2P system 106.

As discussed above, within the exception handling machine 100, there is a long series of pattern-based approval rules. (See section 7).

When a Meta Processing Invoice is identified (by running the invoice against the PO and compared against the known patterns) within the exception handling machine 100 during pre-processing, the exception handling machine 100 will leverage the corresponding strategy indicated by that pattern to process the transaction within the "fuzzy match" approval system 142.

Then, the exception handling machine 100 alters the invoice record to the status of voided before sending the invoice to the P2P system 106, after which the exception handling machine 100 will create a new invoice based on the original invoice header and the PO using, in various embodiments, PO-Flip as the basis. This makes the PO & the invoice match prior to uploading the invoice to the P2P system 106.

6B: Adding Reference Codes

After the exception handling machine 100 voids the original invoice and recreates a new invoice using PO Flip, the record is transmitted to the target P2P System 106. An update call is sent to the P2P system 106 by the exception handling machine 100 to add a reference code to both the new invoice and the old invoice (and optionally the PO), as is shown at 150. This links the two documents so that the client still has access to both versions of the invoice.

Now that the PO and the invoice match, it can be accepted into the P2P system's 106 rigid approval criteria and the payment proceeds through the standard payment/approval flow within the P2P system 106, as is shown at 152.

7: Pattern-Based Approval Rules for Meta Match Processing and/or Pre-Processing

7A: The Rules Engine

The exception handling machine 100 can include the pattern rules engine (as discussed above in 5B). The exception handling machine 100 includes a list of patterns, but the list of patterns can continue to grow as different clients require unique patterns. As more pattern rules are built into the pattern rules master list, in some embodiments, every client will have access to those rules. In other embodiments, some pattern rules may remain proprietary to one client or a subset of clients.

7B: Opting in and Out of Pattern Rules

In one approach, these patterns have an on-off switch on the user interface. The client decides which patterns they want to automate. In accordance with this embodiment, the exception handling machine's 100 easy-to-use on/off switch function enables clients to adjust their automated processes quickly. This on/off automation feature is unique to the exception handling machine 100 and gives clients the freedom to choose how much automation and which particular automated patterns they want to utilize.

7C: Counting the Patterns

As invoices come through this process, the exception handling machine 100 can track the number of times each pattern is recognized within invoices. This can provide the client with insight into common problems with invoices. This also allows clients to see what patterns they are encountering regularly that are not turned on in the rules engine that they may want to turn on, thereby creating an automated process to increase the client's efficiency.

7D: Example Pattern-Based Approval Rules for Meta Match Processing and/or Pre-Processing The following description includes specific examples of pattern-based approval rules which can be implemented and executed by the exception handling machine 100 to provide the Meta Match ("fuzzy match") processing feature. The exception handling machine 100 may execute these pattern-based approval rules on invoices as part of a Meta Match pre-processing procedure prior to being communicated to the P2P system 106, or after an invoice has been identified as a Meta Processing invoice by the P2P system 106.

Example 1: Line Detail Exceptions—Pure Match

In various instances, line detail information within a supplier-provided invoice may not match a PO as is captured and stored within the P2P system 106 ("P2P PO"). In a first example (called a "pure match"), the total amount of the invoice matches the PO total, but the supplier-provided invoice may have different broken-out lines than the PO. For example, the PO may include an a single line for a service, but the supplier-provided invoice may be broken down by various service and/or materials components, as is shown in the example PO and invoice below.

| | P2P PO | | | |
|---|---|---|---|---|
| | Description | Qty. | Unit Price | Total |
| 1 | Paint Office | 1 | $1,000 | $1,000 |
| | | | Total | $1,000 |

| | Supplier-Provided Invoice | | | |
|---|---|---|---|---|
| | Description | Qty. | Unit Price | Total |
| 1 | Paint & Supplies | 1 | $500 | $500 |
| 2 | Labor | 3 | $150 | $450 |
| 3 | Materials Removal | 1 | $50 | $50 |
| | | | Total | $1,000 |

| | New Invoice for P2P | | | |
|---|---|---|---|---|
| | Description | Qty. | Unit Price | Total |
| 1 | Paint Office | 1 | $1,000 | $1,000 |
| | | | Total | $1,000 |

In this first example, the exception handling machine 100 recognizes that the supplier-provided invoice references or points to a PO, which PO exists within the P2P system 106. The exception handling machine 100 also recognizes that the supplier-provided invoice total matches the PO total (or, in some examples, is within a tolerance amount of the PO total). The exception handling machine 100 may also recognize that the number of lines and/or the description of those lines does not match by comparing the lines of the PO to those of the supplier-provided invoice, however the exception handling machine 100 does not necessarily need to perform this step. Instead, this process may be based on the simple recognition that the totals match. The exception handling machine 100 may then determine, based on the detection of the equivalent totals, that the PO and the supplier-provided invoice do match. The exception handling machine 100 may then create a new invoice that matches the P2P PO. In one example, the exception handling machine 100 performs a PO Flip operation to create the new invoice based on the data within the P2P PO. The new invoice is then uploaded into the P2P system 106 for processing, which should be processed as a "perfect match," as shown at 152. Optionally, the supplier-provided invoice may be voided, and a copy may be maintained either in the P2P system 106 and/or on a database maintained by the exception handling machine 100 as associated with the P2P PO and/or the new invoice for record keeping purposes.

By creating the new invoice that matches P2P PO information, the exception handling machine 100 ensures that the new invoice is processed by the P2P system 106 without the P2P system 106 generating one or more errors that would otherwise require manual review of the supplier-provided invoice. This example pattern-based approval rule is a relatively lenient rule, and allows a supplier-provided invoice to be processed as long as it references or points to an existing PO and the total matches (or is within a tolerance amount of) the PO total. Thus, in some approaches, the exception handling machine 100 may attempt to process supplier-provided invoices in accordance with other pattern-based approval rules discussed below prior to processing them with the above example pattern-based approval rule.

Example 2: Line Detail Exceptions—Header Match, Footer Mismatch

In a second example, a total amount of header portion of the supplier-provided invoice matches the total of the header portion of the PO, but the supplier-provided invoice may also include footer amounts that are not present in PO (e.g., for taxes, shipping, etc.). For example, the PO may include an a single line for a service, but the supplier-provided invoice may be broken down by various service and/or materials components and may include a footer section for tax, as is shown in the example PO and invoices below.

| P2P PO | | | |
|---|---|---|---|
| Description | Qty. | Unit Price | Total |
| 1 Paint Office | 1 | $1,000 | $1,000 |
| | | Total | $1,000 |

| Supplier-Provided Invoice | | | |
|---|---|---|---|
| Description | Qty. | Unit Price | Total |
| 1 Paint & Supplies | 1 | $500 | $500 |
| 2 Labor | 3 | $150 | $450 |
| 3 Materials Removal | 1 | $50 | $50 |
| | | Header Total | $1,000 |
| | Tax | | $50 |
| | | Footer Total | $50 |
| | | Total | $1,050 |

| New Invoice for P2P | | | |
|---|---|---|---|
| Description | Qty. | Unit Price | Total |
| 1 Paint Office | 1 | $1,000 | $1,000 |
| | | Header Total | $1,000 |
| | Tax | | $50 |
| | | Footer Total | $50 |
| | | Total | $1,050 |

In this second example, the exception handling machine 100 determines that the total for the supplier-provided invoice does not match the P2P PO via comparison. However, the exception handling machine 100 also determines that the header total in the supplier-provided invoice does match the total (or the header total) of the P2P PO via comparison. Thus, the exception handling machine 100 determines that the total discrepancy is due to a discrepancy within the footer portion of the supplier-provided invoice. In this instance, the exception handling machine 100 determines that the supplier-provided invoice does match the P2P PO.

Typically, the P2P system 106 is configured to allow a certain amount (capped value amount) or a percentage of tolerance as compared to the PO amount when processing an invoice to account for variable aspects of the invoice, such as tax and/or shipping and handling. For example, the P2P system 106 may be configured (e.g., by the user) to allow for a maximum of $100 or 10% for a footer portion of the supplier-provided invoice. Thus, although a total amount of the invoice may not match perfectly, the difference may be a result of an added footer amount, which footer amount may be within the tolerance amount. If so, the P2P system 106 is configured to allow the invoice to be processed.

The exception handling machine 100 is configured such that it knows the preset footer tolerance or maximum amounts and determines whether the footer in the supplier provided invoice is within that tolerance amount. If so, and upon determining that the header portions of the supplier-provided invoice and the P2P PO match, the exception handling machine 100 will allow the invoice to be passed to the P2P system for processing as such an invoice will not generate an error within the P2P system.

In the above example invoices, as with the first example, the exception handling machine 100 will again recognize that the three line items in the header portion of the supplier-provided invoice do not specifically match the one line item within the header portion of the P2P PO, but will recognize that the header total portion matches. As a result, the exception handling machine 100 will determine that the supplier-provided invoice matches the P2P PO. The exception handling machine 100 will then create the new invoice to consolidate the three lines into one line matching the P2P PO, for example, by performing a PO Flip operation to create the header portion of the new invoice, and adding the footer portion from the supplier-provided invoice, to create the new invoice as shown above. The exception handling machine 100 will then upload the new invoice into the P2P system 106 for processing, which should be processed as a matching invoice by the P2P system 106 (as the headers match and the added footer portion is within the acceptable tolerance amount), as shown at 152. Optionally, the original supplier-provided invoice may be voided, and a copy may be maintained either in the P2P system 106 and/or on a database maintained by the exception handling machine 100 as associated with the P2P PO and/or the new invoice for record keeping purposes.

Example 3: Line Detail Exceptions —$0 Line Item

In a third example, a total amount of the header portion of the supplier-provided invoice matches the total of the header portion of the PO, but the supplier-provided invoice may also include one or more $0 line items, as shown in the example PO and invoices below. As with the second example above, the supplier-provided invoice may also include footer amounts that are not present in PO (e.g., for taxes, shipping, etc.). For example, the PO may include an a single line for a service, but the supplier-provided invoice may include an additional $0 line item for a service performed, and may also include a footer section for delivery, as is shown in the tables below.

| P2P PO | | | |
|---|---|---|---|
| Description | Qty. | Unit Price | Total |
| 1 Paint Office | 1 | $1,000 | $1,000 |
| | | Total | $1,000 |

| Supplier-Provided Invoice | | | |
|---|---|---|---|
| Description | Qty. | Unit Price | Total |
| 1 Paint Office | 1 | $1,000 | $1,000 |
| 2 Materials Removal | | | $0 |
| | | Header Total | $1,000 |
| | Delivery | | $50 |
| | | Footer Total | $50 |
| | | Total | $1,050 |

| New Invoice for P2P | | | |
|---|---|---|---|
| Description | Qty. | Unit Price | Total |
| 1 Paint Office | 1 | $1,000 | $1,000 |
| Delivery | | Header Total | $1,000 |
| | | | $50 |
| | | Footer Total | $50 |
| | | Total | $1,050 |

In this third example, the exception handling machine 100 determines that the total for the supplier-provided invoice does not match the P2P PO via comparison. However, the exception handling machine 100 also determines that the header total in the supplier-provided invoice does match the total (or the header total) of the P2P PO via comparison. Thus, the exception handling machine 100 determines that the total discrepancy is due to a discrepancy within the footer portion of the supplier-provided invoice. In this instance, the exception handling machine 100 determines that the supplier-provided invoice does match the P2P PO.

The exception handling machine 100 also determines, based on comparison, whether the number of line items within the header, the unit price of the line items, and/or a quantity for each line item within the supplier-provided invoice do not match the P2P PO. In the above example, the exception handling machine 100 determines that the supplier-provided invoice includes an additional line item not present in the P2P PO ("Materials Removal"), but also determines that the line item is for $0. In this example, the exception handling machine 100 then needs to deal with the $0 line item in order to make the invoice match the P2P PO.

In a first approach, upon recognizing that the extra line item is a $0 line item, the exception handling machine 100 simply removes the extra $0 line item from the invoice to create the new invoice (which is shown above in the new invoice). In certain approaches, the exception handling machine 100 may only perform this step if the other lines within the supplier-provided invoice matches those of the P2P PO. In a second approach, the exception handling machine 100 forces the $0 line item to be a part of the line preceding it (e.g., the first line) such that the line item information is captured in the new invoice, but is simply associated with the first line item. The added footer portion of the supplier-provided invoice is handled by the exception handling machine 100 as described above in the first and second examples. The exception handling machine 100 then passes the new invoice to the P2P system 106 for processing as such an invoice will not generate an error within the P2P system 106.

Example 4: Line Detail Exceptions—Line Total Mismatches

In a fourth example, the exception handling machine 100 may determine, via comparison, that the total of the supplier-provided invoice may match the total of the PO, but that the header total and/or the footer total of the supplier-provided invoice do not match the header total and/or the footer total of the P2P PO. This may occur when, for example, a PO is issued that includes the shipping or tax amounts in the unit price and/or the line item totals, but the supplier-provided invoice has those extra shipping or tax amounts broken out into a footer section, as is shown in the example invoices below. In this instance, the exception handling machine 100 may determine that the supplier-provided invoice does match the indicated PO.

In one approach, the exception handling machine 100 may also detect that a number of the line items in the header portion of the supplier-provided invoice matches the number of line items in the header portion of the P2P PO. In one approach, the exception handling machine 100 may only perform this procedure when the number of line items does match.

In response to determining that the total matches, but the header and footer totals do not match between the supplier-provided invoice and the P2P PO (and, optionally, that the number of lines in the header portion do match), the exception handling machine 100 creates a new invoice by replacing the unit price information for each line item (and thus the total amount for each line item) with the information from the P2P PO, and removes the footer information from the invoice. In essence, the exception handling machine 100, knowing that the invoice totals match, redistributes the amount in the footer portion of the supplier-provided invoice back into line items in accordance with the line items of the P2P PO to ensure the new invoice matches the P2P PO so that it can be processed without errors. The exception handling machine 100 then passes the new invoice to the P2P system 106 for processing as such an invoice will not generate an error within the P2P system 106, which is approved as shown at 152. Optionally, the original supplier-provided invoice may be voided, and a copy may be maintained either in the P2P system 106 and/or on a database maintained by the exception handling machine 100 as associated with the P2P PO and/or the new invoice for record keeping purposes.

| P2P PO | | | | |
|---|---|---|---|---|
| | Description | Qty. | Unit Price | Total |
| 1 | Widgets (box of 50) | 2 | $200 | $400 |
| 2 | Nuts (box of 100) | 3 | $175 | $525 |
| 3 | Bolts (box of 100) | 2 | $125 | $250 |
| | | | Total | $1,175 |

| Supplier-Provided Invoice | | | | |
|---|---|---|---|---|
| | Description | Qty. | Unit Price | Total |
| 1 | Widgets (box of 50) | 2 | $175 | $350 |
| 2 | Nuts (box of 100) | 3 | $150 | $450 |
| 3 | Bolts (box of 100) | 2 | $12 | $240 |
| | | | Header Total | $1,040 |
| | Shipping/Delivery | | | $135 |
| | | | Footer Total | $135 |
| | | | Total | $1,175 |

| | New Invoice for P2P | | | |
|---|---|---|---|---|
| | Description | Qty. | Unit Price | Total |
| 1 | Widgets (box of 50) | 2 | $200 | $400 |
| 2 | Nuts (box of 100) | 3 | $175 | $525 |
| 3 | Bolts (box of 100) | 2 | $125 | $250 |
| | | | Total | $1,050 |

Example 5: Unit of Measure (UOM) Exceptions

In a fifth example, the exception handling machine 100 determines, via comparison, that a total of the supplier-provided invoice matches the total of the P2P PO, but that a unit of measure for one or more line items of the supplier-provided invoice does not match the unit of measure of one or more line items of the P2P PO. For example, as shown in the example PO and invoices below, the supplier-provided invoice may have a different quantity and/or unit price for a line item (shown below as one box of 100 items at $1,000 for a total of $1,000) than the P2P PO (shown below as a 100 individual items at $10 per item for a total of $1,000). In this example, the total number of items and the total amount for those items matches, but the difference is simply in the unit of measure. Without processing by the exception handling machine 100 to address this simple problem, the P2P system 106 would generate an error, thus requiring manual human correction.

Upon detecting the above unit of measure discrepancy, the exception handling machine 100 creates a new invoice that matches the P2P PO details (e.g., with a PO Flip operation), as is shown in the example new invoice below, to ensure the new invoice matches the P2P PO so that it can be processed without errors. The exception handling machine 100 then passes the new invoice to the P2P system 106 for processing as such an invoice will not generate an error within the P2P system 106, which is then approved as shown at 152. Optionally, the original supplier-provided invoice may be voided, and a copy may be maintained either in the P2P system 106 and/or on a database maintained by the exception handling machine 100 as associated with the P2P PO and/or the new invoice for record keeping purposes.

| | P2P PO | | | |
|---|---|---|---|---|
| | Description | Qty. | Unit Price | Total |
| 1 | Widgets | 100 | $10 | $1,000 |
| | | | Total | $1,000 |

| | Supplier-Provided Invoice | | | |
|---|---|---|---|---|
| | Description | Qty. | Box of 100 | Total |
| 1 | Widgets | 1 | $1,000 | $1,000 |
| | | | Total | $1,000 |

| | New Invoice for P2P | | | |
|---|---|---|---|---|
| | Description | Qty. | Unit Price | Total |
| 1 | Widgets | 100 | $10 | $1,000 |
| | | | Total | $1,000 |

Example 6: Discount/Deposit Applied to Line Item

In a sixth example, the exception handling machine 100 may determine that a discount and/or a prepaid amount (such as a deposit or a down payment) has been applied to a total of line item, but not applied to the unit price, as is shown in the example PO and invoices below. The P2P system 106 requires that the product of the unit price times the quantity must equal the line item total, and if the calculated product does not equal the line item total on the invoice, the P2P system 106 will determine that an error is present in the invoice. The P2P system 106 may not detect this discount or prepaid amount and, as a result, may find an error in the invoice in that the product of the unit price and the quantity does not equal the stated line item total.

The exception handling machine 100 may determine that the quantity and unit price for the line item in the supplier-provided invoice matches the quantity and unit price for the same line item in the P2P PO, however the line item totals do not match. The exception handling machine 100 also determines that the line item total on the supplier-provided invoice is less than (not more than) the P2P PO, which indicates that a discount or prepaid amount has been applied.

Optionally, the exception handling machine 100 and/or the invoice processing center 104 may also detect the presence of a discount or a prepaid indication within the supplier-provided invoice, such as the presence of a discount or prepaid column within the invoice or a note within the line item. This information may be captured as part of a customized data field, if needed. If present, upon creating the new invoice, the exception handling machine 100 may remove such indications from the invoice, or may capture them as part of a line item description or a note associated with a line item description in the new invoice. In the example new invoice provided below, the exception handling machine 100 has captured this prepaid information as well as the original price by editing the line item description to include those items of information.

Upon determining that the quantity and unit price match, and the invoice line item total is less than the PO line item total, the exception handling machine 100 may recalculate the unit price for the line item with the discount or prepaid amount discounted from the line item unit price and create a new invoice using this updated unit price. By doing so, the exception handling machine 100 creates a new invoice that will pass the mathematical checking mechanism of the P2P system 106 (which checks to make sure the product of the unit price and the quantity is equal to the line item total), thereby preventing the P2P system 106 from generating an error for the new invoice.

Typically, a P2P system 106 will not find an error in an invoice when the unit price, line item total, or invoice total is less than (or less than by a certain margin) the corresponding unit price, line item total, or PO total of the P2P PO (but may find an error when such amounts in an invoice exceed those of a PO). Thus, the fact that the unit price, line item total, and invoice total are less than those of the P2P PO will not cause the P2P system 106 to generate an error when processing the new invoice.

The exception handling machine 100 then passes the new invoice to the P2P system 106 for processing as such an invoice will not generate an error within the P2P system 106, which is approved as shown at 152. Optionally, the original supplier-provided invoice may be voided, and a copy may be maintained either in the P2P system 106 and/or on a database maintained by the exception handling machine 100 as associated with the P2P PO and/or the new invoice for record keeping purposes.

| P2P PO | | | | |
|---|---|---|---|---|
| | Description | Qty. | Unit Price | Total |
| 1 | Shoes | 1 | $100 | $100 |
| 2 | Uniform | 1 | $200 | $200 |
| | | | Total | $300 |

| Supplier-Provided Invoice | | | | | |
|---|---|---|---|---|---|
| | Description | Qty. | Unit Price | Prepaid | Total |
| 1 | Shoes | 1 | $100 | $20 | $80 |
| 2 | Uniform | 1 | $200 | $0 | $200 |
| | | | | Total | $280 |

| New Invoice for P2P | | | | |
|---|---|---|---|---|
| | Description | Qty. | Unit Price | Total |
| 1 | Shoes (Original: $100) (Prepaid: $20) | 1 | $80 | $80 |
| 2 | Uniform (Prepaid: $0) | 1 | $200 | $200 |
| | | | Total | $280 |

Example 7: Core Deposit Applied to Line Item

In a seventh example, which is similar to the sixth example, but is particular to core deposits, the exception handling machine 100 may determine that a core deposit is included as part of a supplier-provided invoice, but which format does not match that of the PO, as is shown in the example invoices below. A core deposit is paid to a supplier, and which is refunded by the supplier upon receiving the expired or used part which a new part replaces.

As is shown below, the PO includes a line item for a part, and an additional line item for the core deposit. In one example, the exception handling machine 100 and/or the invoice processing center 104 recognizes the term "core" within this line item in the PO, as well as a part number that matches a part number in another line item of the PO. Thus, the exception handling machine 100 determines that this line item of the PO is for the core deposit for that associated part number.

Likewise, in this example, the exception handling machine 100 (and/or the invoice processing center 104) recognizes that the supplier-provided invoice includes, for one or more particular line items, an additional column for a core deposit amount, as is shown below. With such an example invoice, the P2P system 106 would generate multiple errors because the line item total is more than the PO, the product of the unit price and the quantity do not match the stated line item total, and the invoice is missing a line item (core deposit).

The exception handling machine 100 and/or the invoice processing center 104 recognizes this additional column or informational field within the invoice as the core deposit for the part number of that line item. The exception handling machine 100 also determines, via comparison, that the unit price and quantity for the line item match the PO. As such, the exception handling machine 100 determines that the supplier-provided invoice matches the PO. In response, the exception handling machine 100 creates a new invoice that matches the format of the PO. In particular, the exception handling machine 100 adds a new line to the invoice that is a copy of the core deposit line item in the PO. The core deposit column, if present, is also removed from the invoice, and the line item total is updated for the particular line item. An informational field including the core deposit may be created either by the exception handling machine 100 or the invoice processing center 104, and may be included as part of the new invoice as an information field associated with the particular line item.

The exception handling machine 100 then passes the new invoice to the P2P system 106 for processing as such an invoice will not generate an error within the P2P system 106, which is approved as shown at 152. Optionally, the original supplier-provided invoice may be voided, and a copy may be maintained either in the P2P system 106 and/or on a database maintained by the exception handling machine 100 as associated with the P2P PO and/or the new invoice for record keeping purposes.

| P2P PO | | | | |
|---|---|---|---|---|
| | Description | Qty. | Unit Price | Total |
| 1 | P124-32 | 1 | $100 | $100 |
| 2 | P124-32 Core Deposit | 1 | $50 | $50 |
| | | | Total | $150 |

| Supplier-Provided Invoice | | | | | |
|---|---|---|---|---|---|
| | Description | Qty. | Unit Price | Core | Total |
| 1 | P124-32 | 1 | $100 | $50 | $150 |
| | | | | Total | $150 |

| New Invoice for P2P | | | | |
|---|---|---|---|---|
| | Description | Qty. | Unit Price | Total |
| 1 | P124-32 (Core: $50) | 1 | $100 | $100 |
| 2 | P124-32 Core Deposit | 1 | $50 | $50 |
| | | | Total | $150 |

Example 8: Discount/Deposit Applied Globally as Line Item

In an eighth example, the exception handling machine 100 may determine that a discount and/or a prepaid amount has been applied to an entire invoice. As is shown in the example invoices below, the supplier-provided invoice may include an additional line item not present on the PO that provides a discount and/or a deposit that is applied to the entire invoice. Such an invoice will generate an error by the P2P system 106 as including an additional line item not present on the PO.

The exception handling machine 100 may determine that the total of the supplier-provided invoice matches the total of the P2P PO, and that the total for each of the line items (e.g., line item 1), except for the discount/deposit line item, matches the totals for each of the line items of the P2P PO. If so, the exception handling machine 100 then determines that the extra line item is a discount or deposit. The exception handling machine 100 then generates a new invoice by removing the discount/deposit line item from the header of the invoice and adds a new footer line item to apply the discount to the invoice header. By this, the new invoice header line items and total matches those of the PO, and the footer line item, which reduces the price, will not generate an error in the P2P system 106.

The exception handling machine 100 then passes the new invoice to the P2P system 106 for processing as such an invoice will not generate an error within the P2P system 106, which is approved as shown at 152. Optionally, the original supplier-provided invoice may be voided, and a copy may be maintained either in the P2P system 106 and/or on a database maintained by the exception handling machine 100 as associated with the P2P PO and/or the new invoice for record keeping purposes.

| | P2P PO | | | |
|---|---|---|---|---|
| | Description | Qty. | Unit Price | Total |
| 1 | Widgets | 20 | $100 | $2,000 |
| | | | Total | $2,000 |

| | Supplier-Provided Invoice | | | |
|---|---|---|---|---|
| | Description | Qty. | Unit Price | Total |
| 1 | Widgets | 20 | $100 | $2,000 |
| 2 | Deposit | | 10% | ($200) |
| | | | Total | $1,800 |

| | New Invoice for P2P | | | |
|---|---|---|---|---|
| | Description | Qty. | Unit Price | Total |
| 1 | Widgets | 20 | $100 | $2,000 |
| | | | Header Total | $2,000 |
| | Deposit | | | ($200) |
| | | | Footer Total | ($200) |
| | | | Total | $1,800 |

Example 9: Discount/Deposit Applied Globally as Line Item

In a ninth example, which is similar to the eighth example discussed above, the exception handling machine 100 may determine that a discount and/or a prepaid amount has been applied to an entire invoice. As is shown in the example invoices below, the supplier-provided invoice may include an additional line item not present on the PO that provides a discount and/or a deposit that is applied to the entire invoice. Such an invoice will generate an error by the P2P system 106 as including an additional line item not present on the PO. Additionally, in this example, the PO includes a unit price and line item total that includes a discount applied (for example, if such a discount were pre-negotiated at the time of issuance of the PO). Thus, because the supplier-provided invoice includes a different unit price and line item total for one or more lines than the P2P PO will cause the P2P system 106 to generate an error.

The exception handling machine 100 may determine, via comparison, that the total of the supplier-provided invoice matches the total of the P2P PO, but also determines, via a comparison, that the total and/or unit price for each of the line items (e.g., line item 1), except for the discount/deposit line item, fails to match the total and unit price for each of the line items of the P2P PO. If so, the exception handling machine 100 then determines that the extra line item is a discount or deposit, and that the PO has already applied the discount or deposit amount to the line item(s). The exception handling machine 100 then generates a new invoice by removing the discount/deposit line item from the header of the invoice. The exception handling machine 100 also recalculates the unit price and total for each line item by applying the discount or deposit to reduce each accordingly and populating the new invoice accordingly. The exception handling machine 100 also checks to ensure that the recalculated values match those of the P2P PO. Alternatively, the exception handling machine 100 can create a new PO by a PO Flip process, while also ensuring that the recalculated unit price and total from the line items match the PO and new invoice. By this, the unit prices and the line item totals in the new invoice will match those of the PO and will not generate an error in the P2P system 106.

The exception handling machine 100 then passes the new invoice to the P2P system 106 for processing as such an invoice will not generate an error within the P2P system 106 and will be approved as shown at 152. Optionally, the original supplier-provided invoice may be voided, and a copy may be maintained either in the P2P system 106 and/or on a database maintained by the exception handling machine 100 as associated with the P2P PO and/or the new invoice for record keeping purposes.

| | P2P PO | | | |
|---|---|---|---|---|
| | Description | Qty. | Unit Price | Total |
| 1 | Widgets | 20 | $90 | $1,800 |
| | | | Total | $1,800 |

| | Supplier-Provided Invoice | | | |
|---|---|---|---|---|
| | Description | Qty. | Unit Price | Total |
| 1 | Widgets | 20 | $100 | $2,000 |
| 2 | Discount | | 10% | ($200) |
| | | | Total | $1,800 |

| New Invoice for P2P | | | |
|---|---|---|---|
| Description | Qty. | Unit Price | Total |
| 1 Widgets | 20 | $90 | $1,800 |
| | | Total | $1,800 |

Example 10: Blanket Match

In a tenth example, the exception handling machine 100 may determine that a PO is a blanket PO (e.g., by reviewing a data flag or other data field indicating the PO is a blanket PO). A supplier-provided invoice may reference or point to the blanket PO. As such, the quantity, unit price, line item totals, and invoice total will not likely match that of the PO, and the exception handling machine 100 is not concerned with those items (unless, for example, the total exceeds the blanket PO total, a PO line item total, and/or a remaining balance on the blanket PO or a PO line item).

In various approaches, as shown in the example below, the blanket PO is an amount-based blanket PO and will include multiple line items (e.g., "parts" and "labor"). The exception handling machine 100 will match each line item of an invoice to a corresponding line item in the PO by matching at least one term in the description for the invoice line item to a corresponding term within a list of a plurality of terms associated with each PO line item. For example, in the PO, a part number field for each line item may be populated with a comma-separated list of keywords that the exception handling machine 100 uses to match with terms in the line items of the invoice. The lists of keywords in the PO should be unique to each line item and do not overlap so that if a term exists in a line item of the invoice, that term matches only one PO line item. A user may be able to update the keyword list to ensure the keyword list for each line item is up to date.

Once the exception handling machine 100 determines that an invoice line item includes a term that matches at least one unique keyword of a PO line item, the exception handling machine 100 determines that the invoice line item is to be associated with the identified PO line item. The exception handling machine 100 then creates a new invoice that links each invoice line item to a proper matching blanket PO line item. In one approach, the new invoice includes a PO Link information field for each line item that indicates to which PO and PO line item the invoice line item corresponds.

However, in some examples, if an invoice line item matches keywords in more than one PO line item, then the exception handling machine 100 may not automatically match the invoice line item to a PO line item and may instead flag the invoice as requiring further review. Additionally, in some examples, after all the lines of an invoice are matched to the different lines of the PO except for a last remaining line item that does not match any particular PO line item keyword, the exception handling machine 100 can automatically match the unmatched invoice line item to a PO line item (e.g., a dedicated PO line item) so that the invoice can still be processed despite one discrepancy.

The exception handling machine 100 then passes the new invoice to the P2P system 106 for processing as such an invoice will not generate an error within the P2P system 106 and will be approved as shown at 152. Optionally, the original supplier-provided invoice may be voided, and a copy may be maintained either in the P2P system 106 and/or on a database maintained by the exception handling machine 100 as associated with the P2P PO and/or the new invoice for record keeping purposes.

| P2P PO (PO123) | | |
|---|---|---|
| Description | Part No. | Total |
| 1 Parts | Parts, Supplies, Materials, Brakes, Rotor, Gasket | $200,000 |
| 2 Labor | Labor, Services, Time | $300,000 |
| | Total | $500,000 |

| Supplier-Provided Invoice | | | | |
|---|---|---|---|---|
| Description | Part No. | Qty. | Unit Price | Total |
| 1 Parts | P123-32 | 1 | $100 | $100 |
| 2 Services | | 1 | $80 | $80 |
| 3 Parts | P4123-22 | 1 | $300 | $300 |
| | | | Total | $480 |

| New Invoice for P2P | | | | | |
|---|---|---|---|---|---|
| PO Link | Description | Part No. | Qty. | Unit Price | Total |
| 1 PO123-1 | Parts | P123-32 | 1 | $100 | $100 |
| 2 PO123-2 | Services | | 1 | $80 | $80 |
| 3 PO123-1 | Parts | P4123-22 | 1 | $300 | $300 |
| | | | | Total | $480 |

Example 11: Single Line Blanket Match

In an eleventh example, which is a simplified version of the tenth example, the exception handling machine 100 may determine that a PO is a blanket PO (e.g., by reviewing a data flag or other data field indicating the PO is a blanket PO). A supplier-provided invoice may reference or point to the blanket PO. As such, the quantity, unit price, line item totals, and invoice total will not likely match that of the PO, and the exception handling machine 100 is not concerned with those items (unless, for example, the total exceeds the blanket PO total, a PO line item total, and/or a remaining balance on the blanket PO or a PO line item).

In various approaches, as shown in the example below, the blanket PO is an amount-based blanket PO and will include a single line item (e.g., "parts"). The exception handling machine 100 will automatically match each line item of an invoice to the single line item in the PO. The exception handling machine 100 then creates a new invoice that links each invoice line item to the one blanket PO line item. In one approach, the new invoice includes a PO Link information field for each line item that indicates to which PO and PO line item the invoice line item corresponds.

The exception handling machine 100 then passes the new invoice to the P2P system 106 for processing as such an invoice will not generate an error within the P2P system 106 and will be approved as shown at 152. Optionally, the original supplier-provided invoice may be voided, and a copy may be maintained either in the P2P system 106 and/or on a database maintained by the exception handling machine 100 as associated with the P2P PO and/or the new invoice for record keeping purposes.

| P2P PO (PO123) | | |
| --- | --- | --- |
| Description | Part No. | Total |
| 1  Parts | Parts, Supplies, Materials | $200,000 |
| | Total | $200,000 |

| Supplier-Provided Invoice | | | | |
| --- | --- | --- | --- | --- |
| Description | Part No. | Qty. | Unit Price | Total |
| 1  Brakes | P123-32 | 1 | $100 | $100 |
| 2  Rotors | P111-11 | 1 | $130 | $130 |
| 3  Spark Plugs | P552-12 | 20 | $20 | $240 |
| | | | Total | $470 |

| New Invoice for P2P | | | | | |
| --- | --- | --- | --- | --- | --- |
| PO Link | Description | Part No. | Qty. | Unit Price | Total |
| 1  PO123-1 | Brakes | P123-32 | 1 | $100 | $100 |
| 2  PO123-1 | Rotors | P111-11 | 1 | $130 | $130 |
| 3  PO123-1 | Spark Plugs | P552-12 | 12 | $20 | $240 |
| | | | | Total | $470 |

Example 12: No Matching PO Found/Retroactive PO

In a twelfth example, the exception handling machine 100 may determine that an invoice references or points to a PO that is not present within the P2P system 106. In some examples, the invoice may have an incorrect PO number listed. However, a situation often occurs wherein an invoice will be submitted prior to the generation or reception of a matching PO by the P2P system 106. As such, even though the invoice may reference a proper PO, due to the timing of the invoice and the PO, the record of the PO may not be generated yet within the P2P system 106. In such situations where there is no matching PO for an invoice, the exception handling machine 100 performs a method to reduce the likelihood that the invoice will require manual human review.

In a first step, after determining that the invoice does not match a PO, the exception handling machine 100 will delay processing of the invoice for a preset time (e.g., a number of days, business days, hours, etc.), for example, three days, to allow time for the PO to become present within the P2P system 106. This preset delay time can be set and changed by a user. In a second step, during this preset delay time, the exception handling machine 100 will query the P2P system 106 periodically (e.g., every couple of hours) to see if there is a new PO that matches the invoice. If a new matching PO number is found before the expiration of the preset period of time, then the exception handling machine 100 will try to match the invoice to the PO using the above described rules, and, if the match is proper, the exception handling machine 100 will generate a new invoice that will overcome any potential identified errors within the P2P system 106 and submit the new invoice to the P2P system 106 for processing, which will be approved as shown at 152.

However, if the preset period of time passes and no matching PO has been found, the exception handling machine 100 will generate a new invoice with exception flags and is submitted to the P2P system 106 for invoice exception handling, as discussed above.

The exception handling machine 100 also maintains a log of all invoices for which no PO was found and for which an invoice with exception flags was generated and submitted to the P2P system 106 to await manual review and processing. The exception handling machine 100 periodically will check on the status of each invoice on the log within the P2P system 106. If a new PO is found that matches one of the invoices on the log, then the exception handling machine 100 will try to match the invoice with the newly found PO according to one or more of the rules discussed above. If the exception handling machine 100 can successfully match the invoice to the PO, then the exception handling machine 100 will void that existing invoice with the exception flags within the P2P system 106 and will submit an updated new invoice for processing in accordance with the newly found PO. The exception handling machine 100 will then remove the invoice from the log.

The exception handling machine 100 will also check if submitted invoices on the log of invoices without a matching PO have been manually reviewed or handled within the P2P system 106. If so, then the exception handling machine 100 will also remove the invoice from the log and will no longer look for a matching PO for the invoice.

In this manner, the exception handling machine 100 attempts to accommodate situations where the timing of an invoice precedes the corresponding PO, which will reduce the number of invoices that need to manually reviewed within the P2P system 106 simply because of a timing issue. Similarly, even after such an invoice is submitted to be manually reviewed and processed, the exception handling machine 100 continues to attempt to resolve the issue such that manual review may still be avoided if automated review can be completed.

As mentioned above, each of the above pattern-based approval rules can be applied to a supplier-provided invoice in order to match it to a corresponding PO and cause the P2P system 106 to process and approve the invoice without generating errors. Multiple pattern-based approval rules may apply to any given invoice. However, in one approach, the exception handling machine 100 attempts to apply the most restrictive pattern-based rules (e.g., rules that have more specific or narrower applicability) prior to the least restrictive pattern-based rules (e.g., the "pure match" example rule, wherein a match is determined solely by a matching total). This may be in order to preserve as much data from an invoice within the system.

Additionally, as mentioned above, a user may be able to select whether each pattern-based approval rule is implemented or not, and update such selections over time.

Additionally, in various embodiments, the exception handling machine 100 may utilize various machine learning algorithms, which may be trained ahead of time and/or continuously trained, to determine whether an invoice matches a PO and to generate new invoices that will avoid errors within the P2P system 106. Other variations are possible, as well.

FIG. 1 shows an example specific system implementation 200 for the exception handling machine 100 and for the system generally. According to the system implementation, the exception handling machine 100 includes system circuitry 202 to support implementation of the various circuitry elements and functionality discussed above with respect to the various high-level system diagrams and elsewhere. In one embodiment, the system circuitry 202 includes processors 204, memory 206, and/or other circuitry. The processors 204 may be connected to the memory 206 and may comprise a memory system including a plurality of memory devices collocated or distributed across multiple systems. The memory 206 may store control instructions, operational parameters for the control instructions, datasets, and other information. The control instructions may be executed by the processor 204 to implement any of the processing described herein, according to a configuration set by the operational parameters, rules, logic, control instructions, or other instructions. Further, in some embodiments, various circuitry elements of the exception handling machine 100 may be implemented by the system circuitry 202.

The memory 206 may store data and instructions for use by the circuitry elements and/or to implement portions of the circuitry elements. In one embodiment, the memory 206 includes exception handling operating instructions 226 that control the general overall operation of the exception handling machine 100 according to programmed logic and rules. The processors 204, memory 206, and exception handling operating instructions 226 may implement portions of the various circuitry elements discussed above. The memory 206 may also include the client reference database 228 and data verification operating instructions 230, which are used to verify that invoices meet the requirements of the P2P system 106, each of which may be used to implement all or portions of the various circuitry elements discussed above. The memory 206 may also include exception handling rules engine instructions 232 and a set of exception handling rules 234 that enable the exception handling machine 100 to determine an exception rule for an invoice and assign a corresponding exception flag to the invoice prior to being uploaded to the P2P system 106. Similarly, the memory 206 may also include fuzzy match approval operating instructions 236 and a set of pattern-based approval rules 238, which enable to the exception handling machine 100 to perform the "fuzzy match" processing discussed above. Optionally, the memory 206 may also include invoice processing operating instructions 240 wherein the exception handling machine 100 can perform all or some of the functions of the invoice processing center discussed above. Also, the memory 206 may include user interface instructions 242, which may further include graphical user interface (GUI) instructions and data 244. The processors 204, memory 206, user interface instructions 242 and GUI instructions and data 244 may implement portions of the user interface circuitry. Also, in various embodiments, any of the elements described as stored in memory 206 may also be stored in storage 224.

The exception handling machine 100 may also include communication interfaces 208, which may support wireless communication via wireless communication circuitry 210 and antennas 212. Example wireless communication protocols may include Bluetooth, Wi-Fi, WLAN, near field communication protocols, cellular protocols (2G, 3G, 4G, LTE/A), and/or other wireless protocols. Also, communication interface 208 may include wired communication circuitry 214. Example wired communication protocols may include Ethernet, Gigabit Ethernet, asynchronous transfer mode protocols, passive and synchronous optical networking protocols, Data Over Cable Service Interface Specification (DOCSIS) protocols, EPOC protocols, synchronous digital hierarchy (SDH) protocols, Multimedia over coax affiance (MoCA) protocols, digital subscriber line (DSL) protocols, cable communication protocols, and/or other networks and network protocols. The communication interfaces 208 may be connected or configured to connect to the networks 116, including the Internet or an intranet, to enable the exception handling machine 100 and the system circuitry 202 therein to communicate with other systems and devices. Additionally, the communication interface 208 includes system buses 216 to effect intercommunication between various elements, components, and circuitry portions of the machine 100. Example system bus implementations include PCIe, SATA, and IDE based buses.

The communication interfaces 208 may enable interconnection of various circuitry components illustrated in FIG. 1 within the exception handling machine 100 (e.g., via one or more buses, computer component interfaces, or peripheral component interfaces). For example, the communication interfaces 208 may couple to circuitry elements and databases internally via system busses 216 if internally maintained, or externally via the wireless communication circuitry 210 or the wired communication circuitry 214 if externally maintained. The communication interfaces 208 may also support communication with remote storage database 118, client device 120, or other servers 102 or systems.

For example, the other servers 102 may comprise one or more servers of the invoice processing center or of the P2P system 106. In some examples, the invoice processing center and the P2P system 106 comprises a separate server 102 or system from the exception handling machine 100. However, in other examples, all or some of the functions of the invoice processing center described above may be performed by or in the exception handling machine 100. Similarly, in other examples, all or some of the functions of the P2P system 106 described above may be performed by or in the exception handling machine 100. Alternatively still, in yet other examples, some or all of the functions of either or both of the exception handling machine 100 and the invoice processing center may be performed by the P2P system 106. In such an example, the exception handling machine 100 may operate as a subset or under the control of the P2P system 106, thereby incorporating the functionality of the exception handling machine 100 directly into the P2P system 106.

The communication interfaces 208 may also support communication with external client devices 120. Communication with the external client devices 120 may be effected through user interface circuitry and/or with user interface instructions 228. In certain embodiments, the user interface circuitry may provide a dynamically reconfigurable user interface, such as a graphical user interface (GUI) to the external client devices 120 via the networks 116 to enable interaction between the client devices 120 and the exception handling machine 100. The GUI may be provided as a part or portion of a larger software tool or service offering. The GUI may be displayed on a client device 120 or locally via a local display 220. The GUI may be implemented via a web browser operating on the client device 120 and may be display and/or navigated as a web page. Alternatively, the GUI may be implemented as a stand-alone or interconnected software application running on the client device 120. For example, using such a user interface, a user at a client device 120 may be capable of configuring the exception handling machine 100 in accordance with their particular requirements to process invoices or other documents. In one example, the machine 100 comprises a web server capable of providing web services or web pages to the client device 120.

In some embodiments, the machine 100 may itself include various I/O interfaces 218 and/or a display 220, for example, to enable local interaction with the various circuitry elements discussed above instead of or in addition to interaction over the networks 116 with a remote client device 120.

In some examples, the display device 220 can provide a user interface 222 to a local user, which can be the same as or a variation of a user interface that can be provided to a remote client device 120.

Additionally, the I/O interfaces 218 and display 220 may enable local maintenance engineers to interact with the exception handling machine 100. A local GUI may be provided via the local display 220 to present a control dashboard, actionable insights and/or other information to a maintenance engineer. The local GUI may support portable access, such as, via a web-based GUI, to enable maintenance on the machine 100 or other interaction with the exception handling machine 100. This local GUI may be the same as or different from the GUI described elsewhere. The exception handling machine 100 may also include a storage drive 224 (e.g., a hard drive, solid-state drive, or other memory system) to enable local storage of system software, user interfaces, system instructions, client data, or other data.

User interface circuitry may be coupled to a user interface database, which may store logic, instructions, code, images, or other content necessary to generate and provide a user interface, and in particular, a graphical user interface (GUI). The various databases may be implemented on multiple distinct storage devices (e.g., memories or hard drives), on a single storage device, or on a combination thereof. For example, some storage databases may be implemented on a common shared storage device, while other storage databases may be implemented on other distinct storage devices. These storage devices may be local to the machine, for example, housed within the machine or directly connected to the machine. Alternatively, the storage devices, for example, remote database 118, may be connected to the machine 100 over networks 116 such as an intranet (e.g., local) or via the Internet.

The client device 120 may include, for example, a computer (e.g., laptop), a smartphone, or another electronic device capable of communicating with the exception handling machine 100 via the networks 116 or directly. The client device 120 may be a computing device that allows a user to connect to a network 116, such as the Internet. Examples of a client device 120 include, but are not limited to, a personal computer, personal digital assistant ("PDA"), a laptop, a smartphone, a cellular phone, a tablet, or another electronic device. The client device 120 may include a keyboard, keypad, a touch screen interface, or a cursor control device, such as a mouse, or a joystick, a display device, a remote control, and/or any other device operative to view and interact with a user interface. In one embodiment, the user device 120 is configured to request and receive information from the networks 116, for example, using a web browser, such as INTERNET EXPLORER® (sold by Microsoft Corp., Redmond, Washington) or FIREFOX® (provided by Mozilla). Alternatively, the client device 120 may couple directly to the exception handling machine 100 (e.g., via a direct connection or via a local intranet). In another embodiment, the client device 120 and the machine 100 are implemented on the same system, e.g., on a laptop or other computing device.

The methods, devices, processing, circuitry, structures, architectures, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. An exception handling machine comprising:
   a communication interface in communication with a source document processing system and a destination document processing system, the communication interface configured to receive a first document from the source document processing system and provide a first revised document to the destination document processing system; and
   at least one processing device configured to:
   automatically detect at least one exception flag in at least one data field of the first document, wherein the at least one exception flag comprises a predetermined temporary data value that is in the at least one data field to replace previous data in the at least one data field or to add missing data in the at least one data field, wherein the destination document processing system is configured to accept the predetermined temporary data value as a valid input for the at least one data field, and to reject the first document without the predetermined temporary data value in the at least one data field as including erroneous or missing data value in the at least one data field, and wherein the predetermined temporary data value flags a user to update the predetermined temporary data value in the at least one data field with a correct data value in the at least one data field;

automatically determine at least one exception handling rule for the first document based on at least one other data field in the first document and the at least one exception flag;

automatically determine at least one exception code corresponding to the at least one exception handling rule;

insert the at least one exception code into the first document to generate the first revised document, wherein the at least one exception code causes the destination processing system to route the first revised document to the user based on the at least one exception code to update the predetermined temporary data value in the at least one data field with the correct data value in the at least one data field; and cause the communication interface to provide the first revised document to the destination document processing system.

2. The exception handling machine of claim 1 wherein the exception handling machine is further configured to program the destination document processing system to respond to the at least one exception code inserted in the revised first document by providing the first revised document to a client device connected to the destination document processing system.

3. The exception handling machine of claim 1 wherein the exception flag is added to the first document by the source document processing system.

4. The exception handling machine of claim 3 further comprising the source document processing system, wherein the source document processing system is configured to:
retrieve client reference data from the destination processing center including at least one required data field of the first document as required by the destination document processing system and at least one constraint on the at least one required data field;

receive a first original document;
generate the first document from data within the first original document, the first document having a format dictated by the destination document processing system;
determine that the first document is at least one of missing the at least one required data field or includes data within the at least one required data field that does not conform to the at least one constraint on the at least one data field;
add the exception flag to the first document; and
communicate the first document to the exception handling machine.

5. The exception handling machine of claim 1 wherein the exception flag comprises the phrase "Change Me".

6. The exception handling machine of claim 1 wherein the at least one processing device is further configured to:
receive a second document, the second document providing preapproval to allow the destination document processing system to process the first document;
determine that at least one data field in the second document does not match at least one data field in the first document;
determine at least one pattern-based approval rule with which to process the first document and the second document;
process the first document and the second according to the at least one pattern-based approval rule to determine that the first document is approved to be processed by the destination document processing system;
void the first document within the destination document processing system;
generate a third document based on the second document, the third document having a format dictated by the destination document processing system and including the data of the second document; and
provide the third document to the destination document processing system.

7. The exception handling machine of claim 1 wherein the at least one processing device is further configured to:
enable a client device connected to the exception handling machine to enable or disable a selected pattern-based approval rule in order to enable or disable the exception handling machine to process documents with the selected pattern-based approval rule.

* * * * *